(12) United States Patent
Liu et al.

(10) Patent No.: US 12,478,031 B2
(45) Date of Patent: Nov. 25, 2025

(54) URINE ISOLATION PAD WITH DIAPER SUPPORT FUNCTION

(71) Applicant: WELLFINE SILICONE PRODUCTS CO., LTD., Guangdong (CN)

(72) Inventors: Feng Liu, Guangdong (CN); Shihao Wang, Guangdong (CN)

(73) Assignee: WELLFINE SILICONE PRODUCTS CO., LTD., Dongguan (CN)

(*) Notice: Subject to any disclaimer, the term of this patent is extended or adjusted under 35 U.S.C. 154(b) by 0 days.

(21) Appl. No.: 19/027,837

(22) Filed: Jan. 17, 2025

(65) Prior Publication Data
US 2025/0295090 A1    Sep. 25, 2025

(30) Foreign Application Priority Data

Mar. 25, 2024 (CN) .......................... 202420588320.2
Mar. 28, 2024 (CN) .......................... 202420632269.0
Dec. 3, 2024 (CN) .......................... 202422978716.0

(51) Int. Cl.
*A01K 1/01*     (2006.01)

(52) U.S. Cl.
CPC .................. *A01K 1/0107* (2013.01)

(58) Field of Classification Search
CPC .. A01K 1/0107; A01K 1/0157; A01K 1/0125; F16M 2200/08
See application file for complete search history.

(56) References Cited

U.S. PATENT DOCUMENTS

| 6,895,898 B1* | 5/2005 | Kitch ..................... A01K 1/033 |
| | | D30/114 |
| 10,653,107 B2* | 5/2020 | Nelson .................. A01K 1/0125 |
| 2006/0102084 A1* | 5/2006 | Garfield ............... A01K 1/0107 |
| | | 119/165 |
| 2007/0113793 A1* | 5/2007 | Kurahashi ............ A01K 1/0107 |
| | | 119/169 |
| 2008/0178818 A1* | 7/2008 | Aley ..................... A01K 1/0107 |
| | | 119/161 |

FOREIGN PATENT DOCUMENTS

| BR | 102017014798 A2 * | 1/2019 | ............. A01K 23/00 |
| JP | 2012090529 A * | 5/2012 | ........... A01K 1/0107 |
| WO | WO-2019241874 A1 * | 12/2019 | ........... A01K 1/0107 |

* cited by examiner

*Primary Examiner* — Joshua D Huson
*Assistant Examiner* — Alanna K Peterson
(74) *Attorney, Agent, or Firm* — HOWARD M COHN and Associates, LLC

(57) ABSTRACT

The present disclosure relates to a urine isolation pad with a diaper support function including a main body, a bracket installed on a first portion of the main body and including a base and a crossbar, a lower end of the base installed on the main body, an upper end of the base extending upward to a certain height along a direction away from the main body, and the crossbar installed on the upper end of the base. The improved urine isolation pad of the present disclosure is to provide support for pet diapers by the bracket, which has a splash proof without requiring to be attached to walls for being used, and has fewer restrictions to be operated and is more convenient to be used.

15 Claims, 6 Drawing Sheets

URINE ISOLATION PAD WITH DIAPER SUPPORT FUNCTION

BACKGROUND

1. Technical Field

The present disclosure generally relates to the field of pet supplies, and especially relates to a urine isolation pad with a diaper support function.

2. Description of Related Art

In order to maintain indoor cleanliness, pet owners usually place urine isolation pads on the ground and lay pet diapers for pets to defecate. The urine isolation pad is usually placed near a wall, in order to prevent urine from splashing onto the wall, there is a conventional urine isolation pad that an end of the main body is connected to an upright baffle. The baffle is fixed to the wall through suckers and other structures, thereby forming a shield for the splashing urine. Due to the fact that this type of urine isolation pad needs to be attached to structures such as walls in order to maintain the baffle in an upright state, so that a usage of this type of urine isolation pad is relatively limited and there is a room for improvement.

SUMMARY

The technical problems to be solved: in view of the shortcomings of the related art, the present disclosure provides an improved urine isolation pad which can be conveniently used.

The technical solution adopted for solving technical problems of the present disclosure is: a urine isolation pad with a diaper support function according to an embodiment of the present disclosure includes a main body, and a bracket installed on a first portion of the main body and including a base and a crossbar, a lower end of the base installed on the main body, an upper end of the base extending upward to a certain height along a direction away from the main body, and the crossbar installed on the upper end of the base.

Wherein the base includes two housings that the crossbar is connected between the two housings.

Wherein each of the two housings is detachably installed on the main body.

Wherein each of the two housings is connected with a pin, and the crossbar includes two through-holes, the two pins that are connected with the two housings inserted into the two through-holes respectively.

Wherein a flange is formed at a front end of the pin, a radial dimension of the flange greater than a radial dimension of the through-hole, and a gap groove arranged on a sidewall of the pin so that the pin is to deform under a force to detach from the through-hole.

Wherein each of the two housings adopts a strip board that is bent to be fixed to form the housing.

Wherein the strip board includes a first member, a second member and a third member connected in sequence, each of the first member, the second member and the third member bent into a triangular shape along a connection point thereof, and a first free end of the first member detachably connected to a second free end of the third member.

Wherein the first free end of the first member is provided with a tongue, and the second free end of the third member is provided with a groove for inserting the tongue thereinto.

Wherein the urine isolation pad further includes a plurality of first buckles arranged on the first portion of the main body, each third member including a buckling hole, each of the plurality of first buckles clamped in a corresponding buckling hole so that the main body is connected with the third member.

Wherein the buckling hole has a large aperture end and a small aperture end connected to each other, the first buckle entering and separating from the large aperture end, and the small aperture end configured to lock the first buckle.

Wherein the first buckle includes a seat, a clamping head connected to an upper of the seat, and a circular portion formed on a bottom of the clamping head and surrounding the seat, a slot formed on a surface of the clamping head, both ends of the slot passing through the clamping head to connect with the circular portion.

Wherein the slot is curved in shape.

Wherein the plurality of first buckles is arranged on the second portion of the main body that is away from the bracket.

Wherein the urine isolation pad further includes a baffle arranged in an upright posture and detachably installed on the bracket, and the plurality of first buckles arranged on an upper part of the baffle.

Wherein the bracket includes a plurality of ostioles, and the baffle includes a plurality of protrusions respectively embedded into the plurality of ostioles.

Wherein the baffle includes a front plate and a back plate connected in a folding manner, the front plate installed on a front side of the bracket, the back plate installed on a rear side of the bracket, and the plurality of first buckles arranged on the front plate.

Wherein a supporting edge is formed at a bottom of the front plate and in contact with the main body, the supporting edge detachably connected to the main body.

Wherein second buckles are formed at two sides of a lower portion of the front plate, and an inner side of each of the second buckles is provided with an embedding groove.

Wherein anti-skidding teeth are formed on a top wall and a bottom wall of the embedding groove.

Wherein a clamper is arranged on the crossbar.

The present disclosure provides the advantages as below: the improved urine isolation pad provides the bracket, so that the pet's diaper is laid along the main body, and the diaper is bent and supported on the bracket at an end of the main body. The bracket is used to make the diaper stand up, resulting in blocking the wall and preventing pet urine from splashing out of the wall. The urine isolation pad provides the bracket to support the diaper, which can effectively prevent pet urine from splashing onto the wall, making it use more convenient.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. The same reference numerals in the accompanying drawings indicate the same or similar components or parts, one of ordinary skill in the related art should understand that these drawings are not necessarily drawn to scale.

Figure 1:
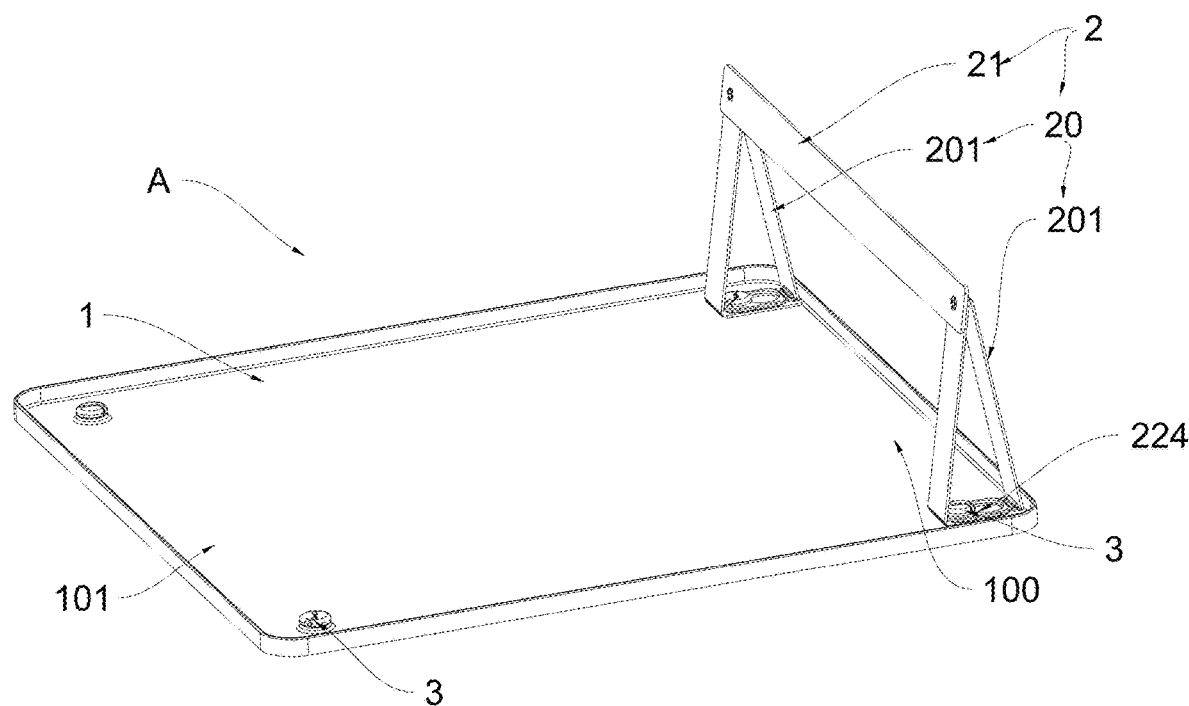
FIG. 1 is a schematic view of a urine isolation pad with a diaper support function in accordance with a first embodiment of the present disclosure.

The element labels according to the embodiment of the present disclosure shown as below:

A urine isolation pad, 1 main body, 100 first portion, 101 second portion, 102 inserting post, 2 bracket, 20 base, 201 housing, 21 crossbar, 210 through-hole, 22 strip board, 221 first member, 2210 first free end, 2211 tongue, 222 second member, 223 third member, 2230 second free end, 2231 groove, 224 buckling hole, 2240 large aperture end, 2241 small aperture end, 225 pin, 2250 gap groove, 226 ostiole, 3 first buckle, 30 seat, 31 clamping head, 32 slot, 33 annular portion, 4 clamper, 5 baffle, 50 front plate, 500 supporting edge, 501 column hole, 51 back plate, 52 protrusion, 6 second buckle, 60 embedding groove, 61 top wall, 62 bottom wall, 63 anti-skidding tooth.

DETAILED DESCRIPTION

In order to more clearly understand the technical solution hereinafter in embodiments of the present disclosure, reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples.

According to the described embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: the terms such as "first" and "second" shown in the specification are only used to describe, but not indicated that the elements of the present disclosure is important or represented the amount of the elements. That is, the features limited by the terms of "first" and "second" may explicitly or implicitly include one or more features. Similar, in the description of the present disclosure, the meaning of the term "one", "a" and "the" don't indicate a quantitative limit, but indicate that it includes at least one unless it is specifically illustrated. Furthermore, the terms such as "include", "including", "comprising" and "comprise" and the like means that elements or items in front of such term is intended to cover the elements or objects appeared the list behind the term and its equivalent, without excluding other elements or items. In the description of the present disclosure, except where specifically otherwise illustrated or limited, the terms "install", "connect", "link" and "fix" used herein should be understood in a broad perceive. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure. In addition, the terms such as "upper", "below", "left", and "right", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

Referring to FIG. 1 to FIG. 5, a urine isolation pad with a diaper support function A according to an embodiment of the present disclosure includes a main body 1 and a bracket 2. The bracket 2 is installed on a first portion 100 of the main body 1 and includes a base 20 and a crossbar 21, a lower end of the base 20 installed on the main body 1, an upper end of the base 20 extending upward to a certain height along a direction away from the main body 1, and the crossbar 21 installed on the upper end of the base 20.

When using the urine isolation pad A, a pet's diaper is laid along the main body 1, bending one end of the pet's diaper that is arranged at the bracket 2 and leaning the end of the pet's diaper that has been bent against the bracket 2. Supporting the pet's diaper through both the base 20 and the crossbar 21 to keep the pet's diaper in an upright state, thereby blocking the pet's urine and preventing the pet's urine from being splashed onto the wall. The bracket 2 of the present disclosure does not need to be attached to the wall, and supporting the pet's diaper by bending the pet's diaper to protect the wall, thereby making the urine isolation pad A be more conveniently and simply to be used.

Figure 6:
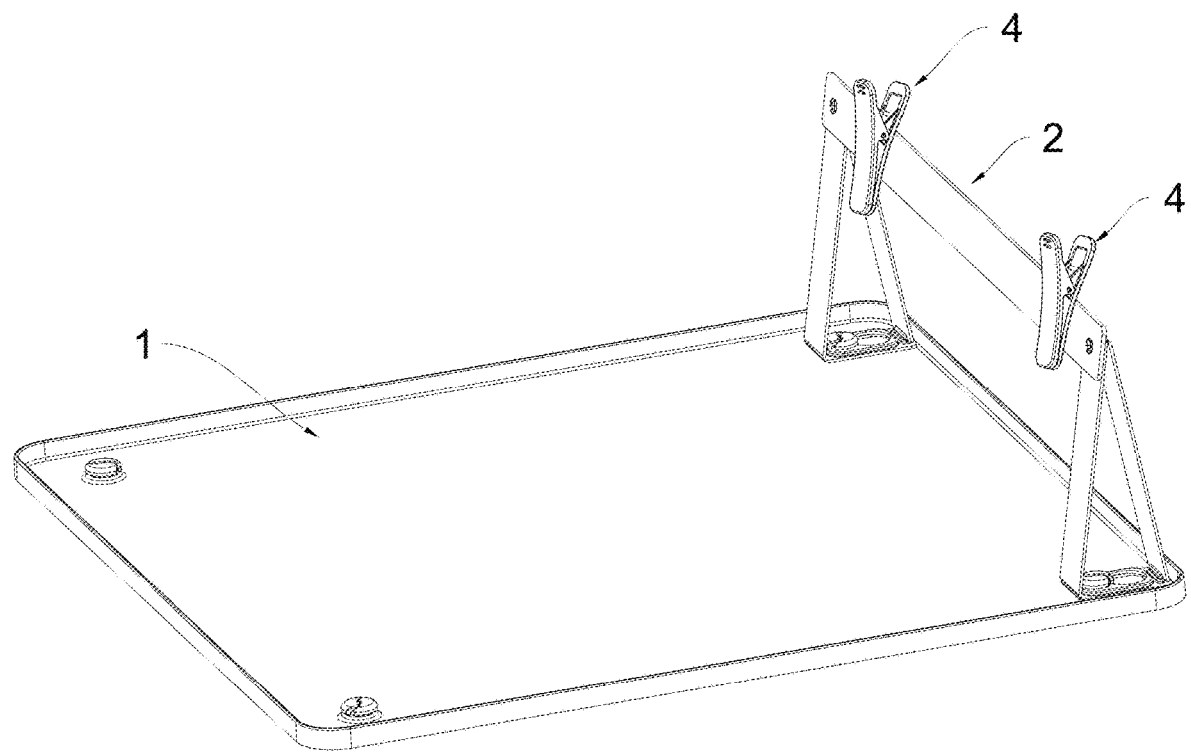
FIG. 6 is a schematic view of a urine isolation pad with a diaper support function in accordance with a second embodiment of the present disclosure.
Figure 7:
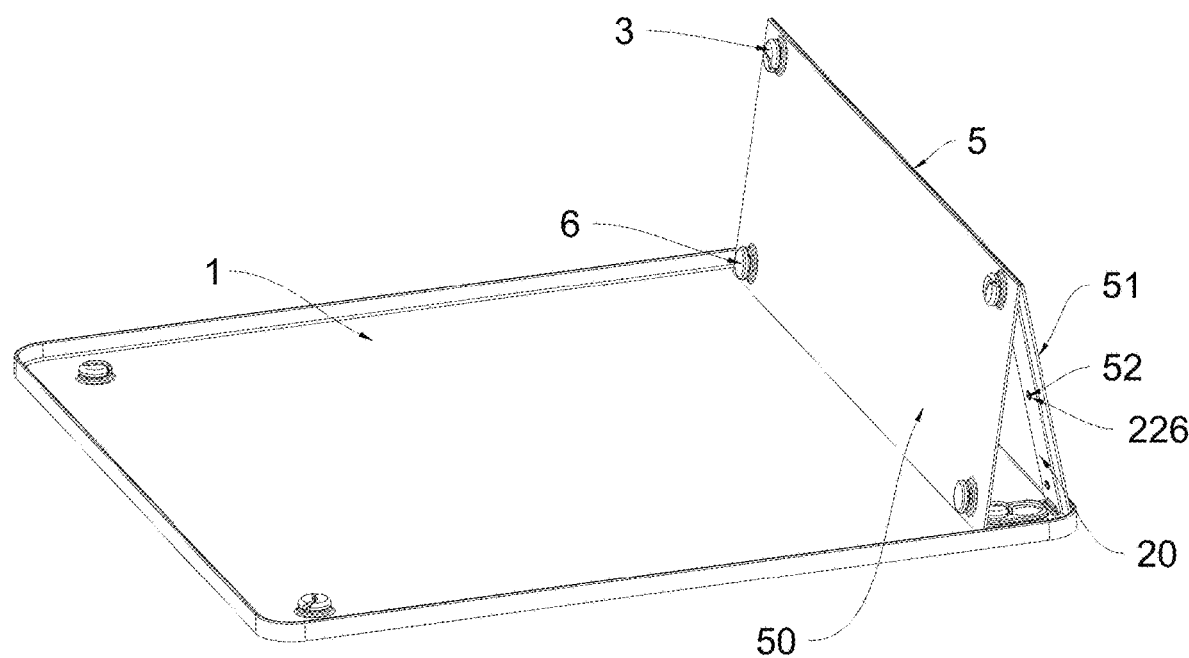
FIG. 7 is a schematic view of a urine isolation pad with a diaper support function in accordance with a third embodiment of the present disclosure.
Figure 8:
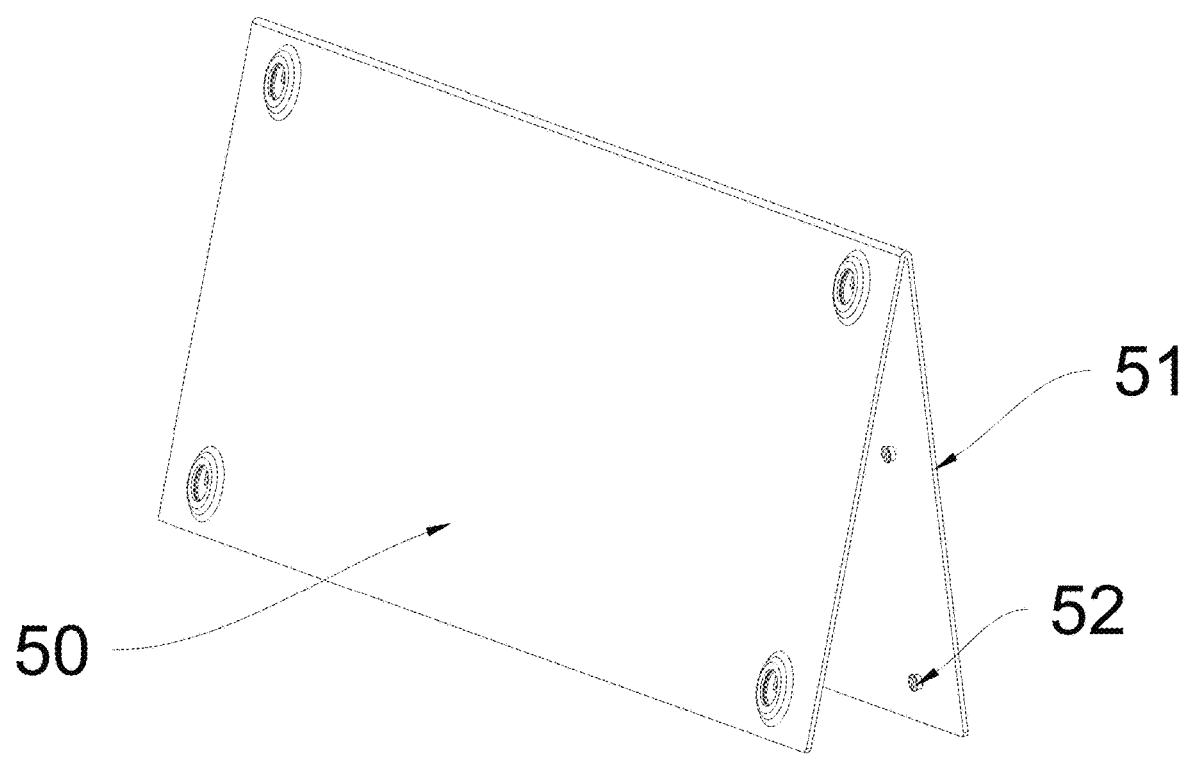
FIG. 8 is a schematic view of a baffle of the urine isolation pad of FIG. 7, shown the baffle in a first state.
Figure 9:
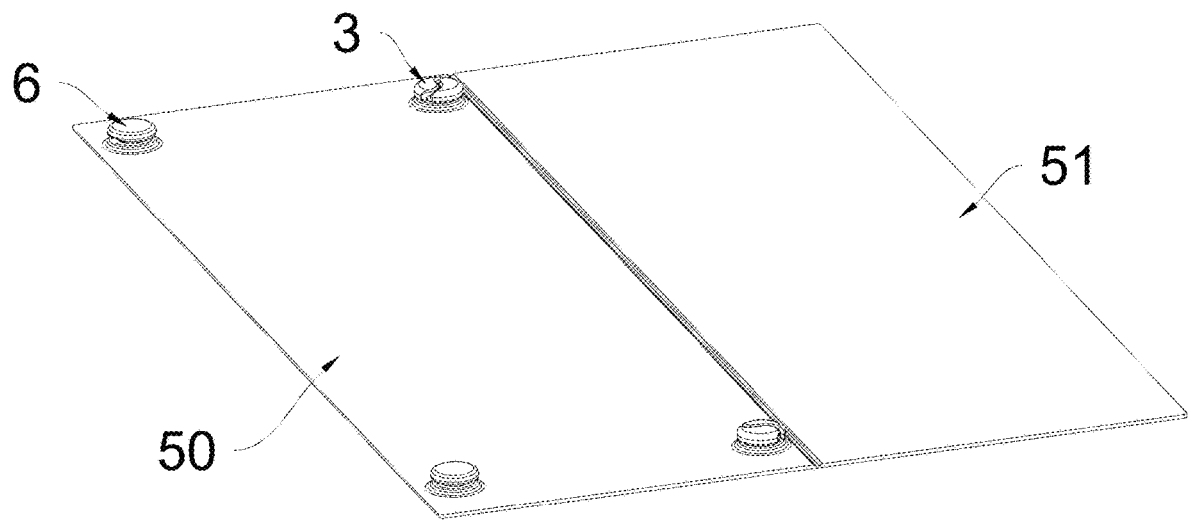
FIG. 9 is similar to FIG. 8, but shown the baffle in a second state.
Figure 10:
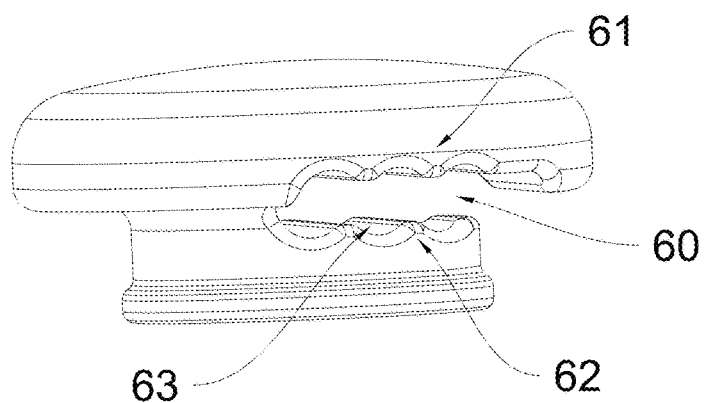
FIG. 10 is a schematic view of a second buckle of the urine isolation pad of FIG. 7.

Of course, users can also use clips to clamp the pet's diaper on the crossbar 21, thereby making the end of the pet's diaper that is bent and upright more stable. Alternatively, as shown in FIG. 6 that the second embodiment of the present disclosure is provided, based on the first embodiment of the present disclosure, a clamper 4 is installed on the crossbar 21. The pet's diaper is laid on the bracket 2 along the main body 1, bent and supported on the bracket 2. The pet's diaper is clamped and fixed to the crossbar 21 through the clamper 4, which is more stable.

The main body 1 is usually made of a plastic material, which can be a soft plastic, so that the main body 1 can be easy to be curled and stored. A shape of the main body 1 is usually square or other conventional shapes, and the bracket 2 can be made of hard plastic or metal materials. The base 20 of the bracket 2 can be a individual integral component or a plurality of components that is separated. For example, the base 20 adopts a individual integral component, and is installed on a middle of the first portion 100 of the main body 1. And then, a middle of the crossbar 21 is fixed to an upper end of the base 20, so that the crossbar 21 is horizontally supported on the first portion 100 of the main body 1. In this way, the crossbar 21 is horizontally installed above the main body 1, and an extension direction of the crossbar 21 matches with an extension direction of an end edge of the first portion 100 of the main body 1.

The base 20 can adopt a plurality of separate components, for example, in the first embodiment shown in FIG. 1, the base 20 adopts two individual housings 201 respectively installed on upper and lower sides of the first portion 100 of the main body 1. The crossbar 21 is connected on the two individual housings 201, such method of using the two individual housings 201 to erect the crossbar 21 is more stable.

The individual housing 201 is installed on the main body 1 in a detachable manner, such as using common buckle structures. The bottom of the individual housing 201 is connected to the main body 1, and when the urine isolation pad A is not in use, the individual housing 201 can be removed for being easily stored. An assembly mode of the individual housing 201 and the crossbar 21 can be fixed, but it is preferred to use a detachable mode. For example, a pin 225 is installed on the individual housing 201, and a through-hole 210 is provided on the crossbar 21. The pin 225 is inserted into the through-hole 210. Specifically, the pin 225 is installed on a front side of each of the two individual housings 201, and the through-hole 210 is installed at each of two ends of the crossbar 21. Each of the two pins 225 is inserted into a corresponding through-hole 210, and thus the crossbar 21 is supported on the main body 1 by the two individual housings 201.

Furthermore, a flange is formed at a front end of the pin 225, a radial dimension of the flange greater than a radial dimension of the through-hole 210, and a gap groove 2250 arranged on a sidewall of the pin 225 so that the pin 225 is to deform under a force to detach from the through-hole 210. The front end of the pin 225 is exposed out of the through-hole 210. Due to a large radial size of the flange, to that the flange is to obstruct the through-hole 210, thereby preventing the pin 225 from easily detaching from the through-hole 210, resulting in stabilizing the crossbar 21 on the two housings 201. When it is necessary to remove the crossbar 21, a large tensile force is applied to a portion of the crossbar 21 that is near the through-hole 210. The through-hole 210 will exert a large compressive force on the pin 225 at the flange, and the gap groove 2250 is provided to allow the pin 225 to deform under the force, thereby breaking free from the restriction of the through-hole 210 and disassembling the crossbar 21.

In some embodiments of the present disclosure, each of the two housings 201 adopts a strip board 22 that is bent to be fixed to form the housing 201. When the urine isolation pad is not in use, the two housings 201 can be opened in a straight strip shape for easy storage. When the urine isolation pad needs to be used, the two housings 201 can be bent into a shape that is needed.

Figure 2:
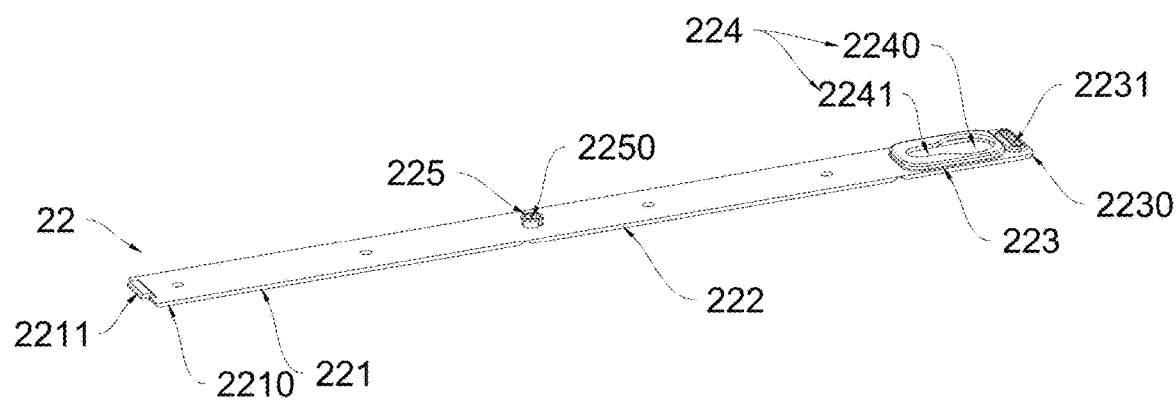
FIG. 2 is a schematic view of a strip board of the urine isolation pad of FIG. 1.
Figure 3:
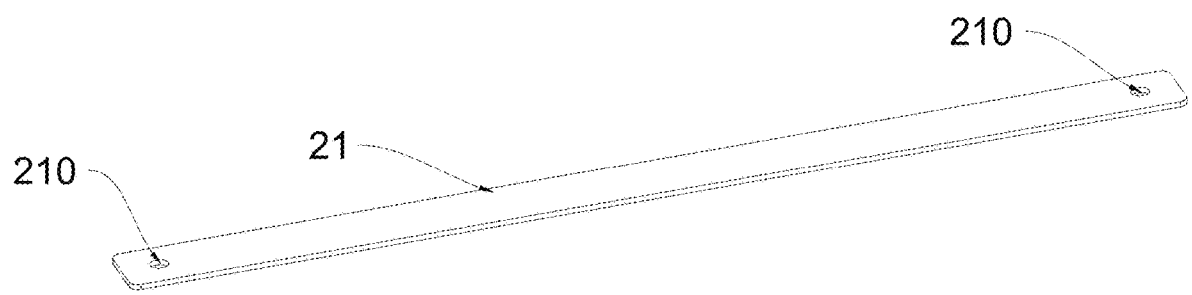
FIG. 3 is a schematic view of a crossbar of the urine isolation pad of FIG. 1.
Figure 4:
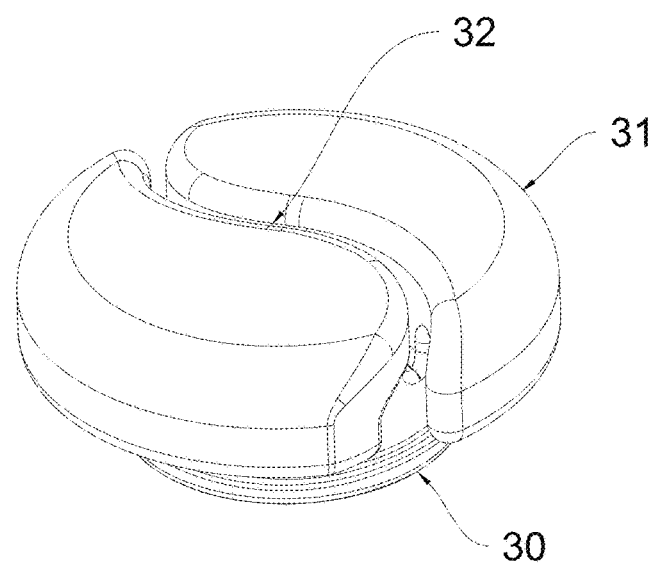
FIG. 4 is a schematic view of a first buckle of the urine isolation pad of FIG. 1.
Figure 5:
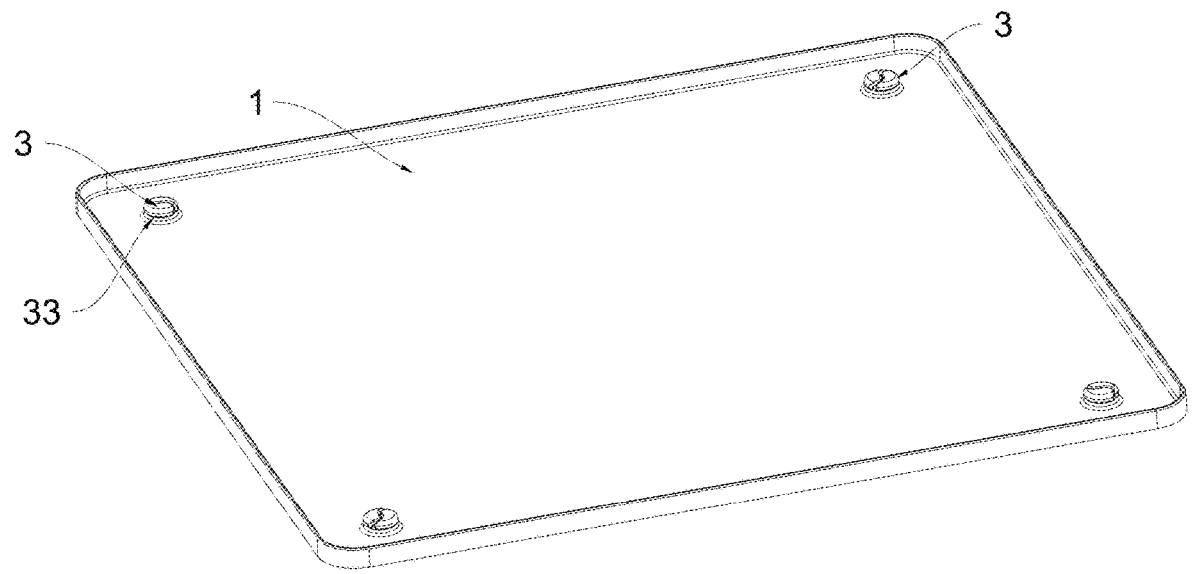
FIG. 5 is a schematic view of a main body of the urine isolation pad of FIG. 1.

Specifically, referring to FIG. 1 and FIG. 2, the strip board 22 includes a first member 221, a second member 222 and a third member 223 connected in sequence, each of the first member 221, the second member 222 and the third member 223 bent into a triangular shape along a corresponding connection point thereof, and a first free end 2210 of the first member 221 detachably connected to a second free end 2230 of the third member 223. When it needs to be used, bending the corresponding connection point of the first, second and third members into a triangle, and then connecting the first member 221 and the third member 223 so that the housing 201 is formed to be a stable triangle shape. When it is not in use, the first member 221 and the third member 223 are untied, and then the first member 221, the second member 222 and the third member 223 are unfolded into a straight strip shape, thereby occupying a less space and facilitating to be stored.

There are many detachable connection methods for the first member 221 and the third member 223, for example, the first free end 2210 of the first member 221 is provided with a tongue 2211, and the second free end 2230 of the third member 223 is provided with a groove 2231 for inserting the tongue 2211 thereinto. When disassembling the first member 221 and the third member 223, simply pulling the tongue 2211 out of the groove 2231.

In some embodiments of the present disclosure, the urine isolation pad A further includes a plurality of first buckles 3 arranged on the first portion 100 of the main body 1, each third member 223 including a buckling hole 224, each of the plurality of first buckles 3 clamped in a corresponding buckling hole 224 so that the main body 1 is connected with the third member 223.

The first buckle 3 is installed on each of upper and lower sides of the first portion 100 of the main body 1. At the same time, there is the housing 201 arranged on each of upper and lower sides of the main body 1. The third member 223 of each housing 201 is provided with a buckling hole 224, and each first buckle 3 is fastened into the corresponding buckling hole 224, thereby fixing the two housings 201 to the main body 1. The buckling hole 224 has a large aperture end 2240 and a small aperture end 2241 connected to each other, the first buckle 3 entering and separating from the large aperture end 2240, and the small aperture end 2241 configured to lock the first buckle 3. When the first buckle 3 needs to fasten with the housing 201, aligning the large aperture end 2240 with the first buckle 3, and then moving the housing 201 so that the first buckle 3 is slid in the small aperture end 2241 to be locked into the small aperture end 2241. When it is necessary to disconnect the first buckle 3 from the housing 201, applying a force to the housing 201 to move the housing 201 to the large aperture end 2240 and corresponding to the first buckle 3, and then disengaging from the first buckle 3 to remove the housing 201.

Preferably, the first buckle 3 is designed into the following structure: the first buckle 3 includes a seat 30, a clamping head 31 connected to an upper of the seat 30, and a circular portion 33 formed on a bottom of the clamping head 31 and surrounding the seat 30, a slot 32 formed on a surface of the clamping head 31, both ends of the slot 32 passing through the clamping head 31 to connect with the circular portion 33.

The first buckle 3 is installed on a corresponding structure through the seat 30, for example, installed on upper and lower sides of the first portion 100 of the main body 1. The bottom of the seat 30 is connected to the main body 1 through a tight insertion and a snap connection, etc. The clamping head 31 is integrally formed on the upper of the seat 30, with a larger radial size, so as to fit with the buckling hole 224. After unfastening the first buckle 3 and disassembling the bracket 2, the main body 1 can still be used as a urine isolation pad A without a splash prevention function. At this time, the first buckle 3 of the first portion 100 of the main body 1 can be used to fix pet diapers. Specifically, the slot 32 that is arranged on the clamping head 31 is configured to clamp the pet's diaper. A top corner of the pet's diaper is twisted into a thin rope shape and then inserted into the slot 32, and winded down from an end of the slot 32 into the annular portion 33, and surrounding along the seat 30. The top corner of the pet's diaper is clamped by the slot 32 and wrapped between the clamping head 31 and the main body 1, and finally tightly connected to the first buckle 3. The slot 32 is preferably curved to enhance a coordination strength with pet diapers.

After the slot 32 and other structures are arranged on the clamping head 31 of the first buckle 3, it has the function of fixing the pet's diaper. Therefore, a plurality of first buckles 3 can be installed on the second portion 101 of the main body 1, that is, on the bracket 2 at a position away from the bracket 2 and away from the first portion 100. A part of the pet's diaper that is laid on the second portion 101 of the main body 1 can be fixed by the plurality of first buckles 3. Generally, the plurality of first buckles 3 are set on upper and lower sides of the second portion 101, to fix two top corners of the pet's diaper.

Referring to FIGS. 7-10, a urine isolation pad with a diaper support function A according to a third embodiment of the present disclosure is provided. Based on the main body 1 and the bracket 2, the urine isolation pad A of the third embodiment further includes a baffle 5 arranged in an upright posture and detachably installed on the bracket 2, and the plurality of first buckles 3 arranged on an upper part of the baffle 5. Two first buckles 3 are respectively arranged on both sides of the upper part of the baffle 5, one end of the pet's diaper is laid on the main body 1, and the other end of the pet's diaper is attached to the baffle 5 and fixed by the first buckle 3. In this way, the laying state of the pet's diaper is more stable and a splash proof effect is better.

In order to enhance the connection stability between baffle 5 and the bracket 2, the bracket 2 includes a plurality of ostioles 226, and the baffle 5 includes a plurality of protrusions 52 respectively embedded into the plurality of ostioles 226. When disassembling the baffle 5, the baffle 5 is simply removed from the plurality of protrusions 52 for storage purposes.

In some embodiments of the present disclosure, the baffle 5 includes a front plate 50 and a back plate 51 connected in a folding manner, the front plate 50 installed on a front side of the bracket 2, the back plate 51 installed on a rear side of the bracket 2, and the plurality of first buckles 3 arranged on the front plate 50. The front plate 50 and the back plate 51 can be suspended on the bracket 2 through the crossbar 21, thereby making installation very convenient. Of course, in order to ensure the installation stability of the baffle 5, a matching structure such as the protrusion 52 and the ostiole 226 as described above can be set between the baffle 5 and the bracket 2. Two first buckles 3 are respectively arranged on both sides of the upper part of the front plate 50 so as to fix a part of the pet's diaper that is in a bent and upright state.

In some embodiments of the present disclosure, second buckles 6 are formed at two sides of a lower portion of the front plate 50, and an inner side of each of the second buckles 6 is provided with an embedding groove 60. One end of the pet's diaper is laid on the main body 1, and the other end of the pet's diaper is bent and supported on the front plate 50. An upper of the bent part of the pet's diaper is fixed by the first buckle 3 that is arranged on the upper part of the front plate 50, and the lower end of the bent part is fixed by the second buckle 6 on the front plate 50. An edge of the pet diaper in this part is inserted into the corresponding embedding groove 60, thereby making an overall laying of the pet diaper more stable and comfortable.

Furthermore, anti-skidding teeth 63 can be installed on a top wall 61 and a bottom wall 62 of the embedding groove 60, so that the pet's diaper is to get stuck and difficult to be detached.

Figure 11:
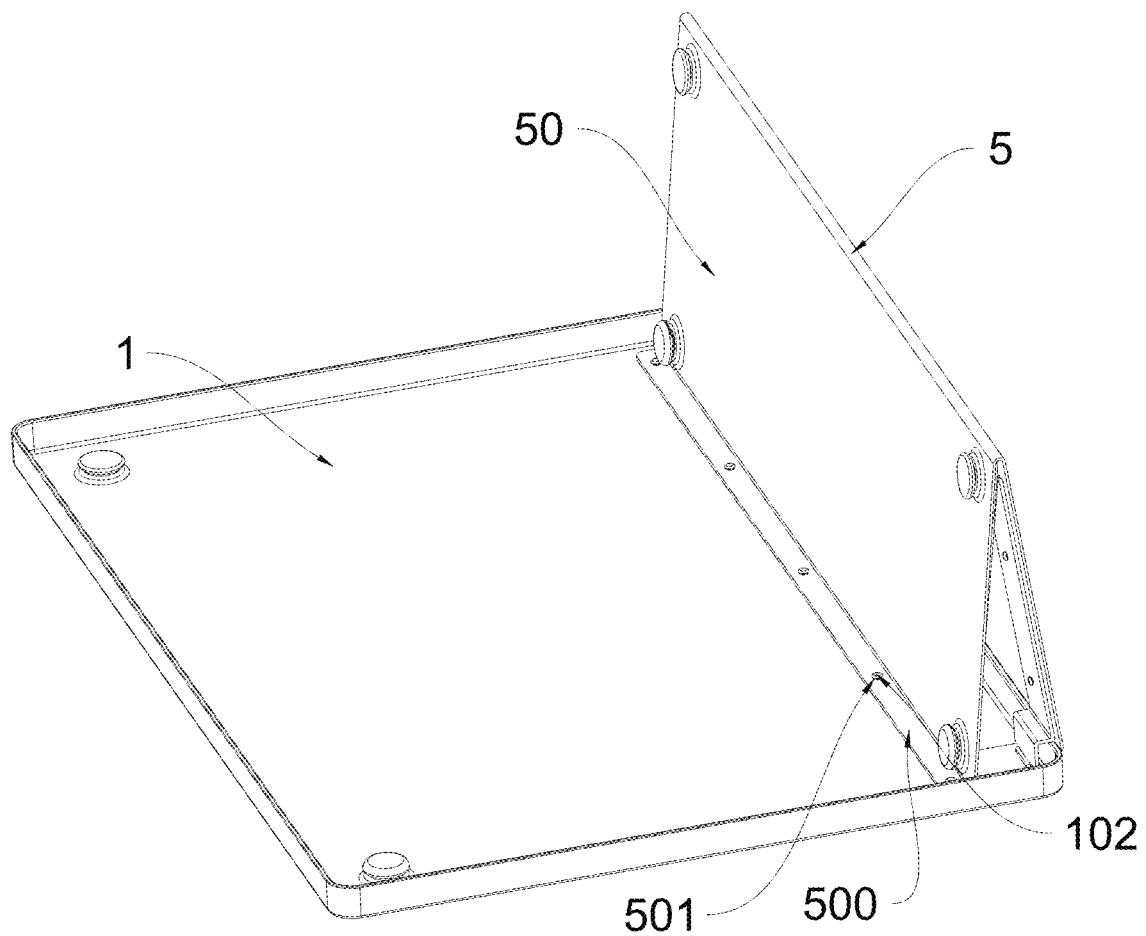
FIG. 11 is a schematic view of a urine isolation pad with a diaper support function in accordance with a fourth embodiment of the present disclosure.

Referring to FIG. 11, a urine isolation pad with a diaper support function according to a fourth embodiment of the present disclosure is provided. In the fourth embodiment, a supporting edge 500 is formed at a bottom of the front plate 50 and in contact with the main body 1, and the supporting edge 500 is detachably connected to the main body 1. For example, a connection between the supporting edge 500 and the main body 1 is obtained through coordination of an inserting post 102 and a column hole 501, which enhances the stability of the baffle 5.

To sum up, the improved urine isolation pad of the present disclosure is to provide support for pet diapers by the bracket, which has a splash proof without requiring to be attached to walls for being used, and has fewer restrictions to be operated and is more convenient to be used.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A urine isolation pad with a diaper support function comprising:
   a main body; and
   a bracket installed on a first portion of the main body and comprising a base and a crossbar, a lower end of the base installed on the main body, an upper end of the base extending upward to a certain height along a direction away from the main body, and the crossbar installed on the upper end of the base;
   wherein the base comprises two housings, and the crossbar is connected between the two housings;
   wherein each of the two housings is detachably installed on the main body, and each of the two housings adopts a strip board that is bent to be fixed to form the housing;
   wherein the strip board comprises a first member, a second member and a third member connected in sequence, each of the first member, the second member and the third member bent into a triangular shape along a connection point thereof, and a first free end of the first member detachably connected to a second free end of the third member;
   wherein the urine isolation pad further comprises a plurality of first buckles, the plurality of first buckles comprise housing mounting buckles, the housing mounting buckles are arranged on the first portion of the main body, each third member comprising a buckling hole, and each of the housing mounting buckles is clamped in a corresponding buckling hole so that the main body is connected with the third member.

2. The urine isolation pad as claimed in claim 1, wherein the two housings are one-to-one connected with two pins, and the crossbar comprises two through-holes, the two pins that are connected with the two housings are inserted into the two through-holes respectively.

3. The urine isolation pad as claimed in claim 2, wherein a flange is formed at a front end of each of the pins, a radial dimension of the flange is greater than a radial dimension of each of the through-holes, and a gap groove is arranged on a sidewall of each of the pins so that each of the pins is deformed under a force to detach from a corresponding one of the through-holes.

4. The urine isolation pad as claimed in claim 1, wherein the first free end of the first member is provided with a tongue, and the second free end of the third member is provided with a groove for inserting the tongue thereinto.

5. The urine isolation pad as claimed in claim 1, wherein each buckling hole has a large aperture end and a small aperture end connected to the large aperture end, each of the housing mounting buckles is allowed to pass through the large aperture end of the corresponding buckling hole and is locked in the small aperture end of the corresponding buckling hole.

6. The urine isolation pad as claimed in claim 1, wherein each of the plurality of first buckles comprises a seat, a clamping head connected to an upper of the seat, and a circular portion formed on a bottom of the clamping head and surrounding the seat, wherein a slot is formed on a surface of the clamping head, two ends of the slot passing through the clamping head to connect with the circular portion.

7. The urine isolation pad as claimed in claim 6, wherein the slot is curved in shape.

8. The urine isolation pad as claimed in claim 6, wherein the plurality of first buckles further comprise strip board mounting buckles, wherein each of the strip board mounting buckles is arranged on a second portion of the main body that is away from the bracket.

9. The urine isolation pad as claimed in claim 6, wherein the urine isolation pad further comprises a baffle arranged in an upright posture and detachably installed on the bracket, and the plurality of first buckles further comprise baffle mounting buckles arranged on an upper part of the baffle.

10. The urine isolation pad as claimed in claim 9, wherein the bracket comprises a plurality of ostioles, and the baffle comprises a plurality of protrusions respectively embedded into the plurality of ostioles.

11. The urine isolation pad as claimed in claim 9, wherein the baffle comprises a front plate and a back plate connected in a folding manner, wherein the front plate is installed on a front side of the bracket, the back plate is installed on a rear side of the bracket, and the baffle mounting buckles are arranged on the front plate.

12. The urine isolation pad as claimed in claim 11, wherein a supporting edge is formed at a bottom of the front plate and in contact with the main body, the supporting edge is detachably connected to the main body.

13. The urine isolation pad as claimed in claim 11, wherein second buckles are formed at two sides of a lower portion of the front plate, and an inner side of each of the second buckles is provided with an embedding groove.

14. The urine isolation pad as claimed in claim 13, wherein anti-skidding teeth are formed on a top wall and a bottom wall of the embedding groove.

15. The urine isolation pad as claimed in claim 1, wherein a clamper is arranged on the crossbar.

* * * * *